(12) United States Patent
Cheiky et al.

(10) Patent No.: US 6,459,243 B1
(45) Date of Patent: Oct. 1, 2002

(54) MULTIPLE PLATEAU BATTERY CHARGING METHOD AND SYSTEM TO FULLY CHARGE THE FIRST PLATEAU

(75) Inventors: Michael Cheiky; Te-Chien F. Yang, both of Santa Barbara, CA (US)

(73) Assignee: Zinc Matrix Power, Inc., Santa Barbara, CA (US)

(*) Notice: Subject to any disclaimer, the term of this patent is extended or adjusted under 35 U.S.C. 154(b) by 0 days.

(21) Appl. No.: 10/021,838

(22) Filed: Dec. 14, 2001

(51) Int. Cl.⁷ .................. H01M 10/46; H01M 10/44
(52) U.S. Cl. .................................. 320/155; 320/160
(58) Field of Search .................................. 320/124, 125, 320/137, 155, 157, 159, 160, 162, 163, 164

(56) References Cited

U.S. PATENT DOCUMENTS

| | | |
|---|---|---|
| 3,708,738 A | 1/1973 | Crawford et al. |
| 4,113,921 A | 9/1978 | Goldstein et al. |
| 4,313,078 A * | 1/1982 | Bilsky et al. |
| 4,388,582 A | 6/1983 | Saar et al. |
| 4,392,101 A | 7/1983 | Saar et al. |
| 4,609,861 A * | 9/1986 | Inaniwa et al. |
| 4,719,401 A | 1/1988 | Altmeid |
| 4,745,349 A | 5/1988 | Palanisamy |
| 5,049,803 A | 9/1991 | Palanisamy |
| 5,089,765 A | 2/1992 | Yamaguchi |
| 5,160,880 A | 11/1992 | Nasar et al. |
| 5,166,596 A | 11/1992 | Goedken |
| 5,204,611 A | 4/1993 | Nor et al. |
| 5,248,928 A * | 9/1993 | Gilmore |
| 5,270,635 A | 12/1993 | Hoffman et al. |
| 5,307,000 A | 4/1994 | Podrazhansky et al. |
| 5,387,857 A | 2/1995 | Honda et al. |
| 5,396,163 A | 3/1995 | Nor et al. |
| 5,438,250 A | 8/1995 | Retzlaff |
| 5,642,031 A | 6/1997 | Brotto |
| 5,721,688 A | 2/1998 | Bramwell |
| 5,747,964 A | 5/1998 | Turnbull |
| 5,821,733 A | 10/1998 | Turnbull |
| 5,982,144 A | 11/1999 | Johnson et al. |
| 6,025,696 A | 2/2000 | Lenhart et al. |
| 6,037,751 A | 3/2000 | Klang |
| 6,094,034 A * | 7/2000 | Matsuura |
| 6,097,172 A | 8/2000 | Podrazhansky et al. |
| 6,104,167 A | 8/2000 | Bertness et al. |
| 6,124,700 A | 9/2000 | Nasar et al. |
| 6,137,268 A | 10/2000 | Mitchell et al. |
| 6,215,291 B1 | 4/2001 | Mercer |
| 6,215,312 B1 | 4/2001 | Hoenig et al. |
| 6,222,343 B1 | 4/2001 | Crisp et al. |
| 6,252,373 B1 | 6/2001 | Stefanson |

FOREIGN PATENT DOCUMENTS

| | | |
|---|---|---|
| EP | 1076397 A1 | 2/2001 |
| FR | 2683093 A1 | 4/1993 |
| GB | 892954 | 4/1962 |
| GB | 21/8608 A | 2/1987 |
| WO | WO00/14848 | 3/2000 |
| WO | WO01/147086 | 3/2000 |

* cited by examiner

*Primary Examiner*—Edward H. Tso
(74) *Attorney, Agent, or Firm*—Marvin E. Jacobs (57) ABSTRACT

A battery charging method and system, the battery charging method comprising: charging at least one battery at a first voltage for a first time duration; determining state of charge of the batteries at the end of the first time duration; if the batteries are substantially fully charged at the end of the first time duration, charging the batteries at the first voltage for a second time duration, and charging the batteries at a second voltage for a third duration of time; if the batteries are substantially fully depleted at the end of the first time duration, charging the batteries at the first voltage for an alternate second time duration, and charging the batteries at the second voltage for an alternate third duration of time. The battery charging system comprises: a current source; a cutoff voltage controller and timer; at least one battery; and respective ones of voltage and current regulators, which regulate voltages applied to each of the respective ones of the batteries and current supplied to the respective batteries, the cutoff voltage controller and timer controlling the voltages and controlling time durations of the voltages applied to each of the respective ones of the batteries therethrough control of the voltage and current regulators.

18 Claims, 9 Drawing Sheets

| BATTERY AND CHARGING CHARACTERISTICS | CHARGED AT FIRST CUTOFF VOLTAGE FOR TIME DURATION T1 | | CHARGED AT FIRST CUTOFF VOLTAGE FOR TIME DURATION T2 (FROM COMMENCEMENT OF CHARGING) | | CHARGED AT SECOND CUTOFF VOLTAGE FOR TIME DURATION T3 | |
|---|---|---|---|---|---|---|
| STATE OF BATTERY CHARGE | FIRST CUTOFF VOLTAGE | TIME DURATION T1 | FIRST CUTOFF VOLTAGE | TIME DURATION T2 | SECOND CUTOFF VOLTAGE | TIME DURATION T3 |
| SUBSTANTIALLY FULLY CHARGED | 1.87 VOLTS | 1 HOUR | 1.87 VOLTS | 10 HOURS | 1.98 VOLTS | 2 HOURS |
| NOT SUBSTANTIALLY FULLY CHARGED | 1.87 VOLTS | 1 HOUR | 1.87 VOLTS | 8 HOURS | 1.98 VOLTS | 4 HOURS |

MULTIPLE PLATEAU BATTERY CHARGING METHOD AND SYSTEM TO FULLY CHARGE THE FIRST PLATEAU

TECHNICAL FIELD

The present invention relates generally to battery charging methods and system and more particularly to charging methods and systems for preventing battery overcharge.

CROSS-REFERENCES TO RELATED APPLICATIONS

The present application is related to two copending applications, one patent application, entitled "Battery Charging System," and the other patent application, entitled "Battery Charging Method and System," each by inventors Michael Cheiky and Te-Chien Felix Yang, serial numbers to be determined, each filed Dec. 14, 2001, which are included herein by this reference, and which are not admitted to be prior art with respect to the present invention.

BACKGROUND OF THE INVENTION

Rechargeable batteries, for storing electrical energy, and battery chargers, for charging batteries and bringing the batteries back to a charged state, after the batteries have been depleted, have been known and are common. Typically, the batteries are charged after full or partial depletion by delivering energy to the batteries and reversing chemical processes within the batteries, by applying a voltage to the batteries, forcing current through the batteries, and, thus, restoring charge. A common charging method is to apply a voltage source to the battery to be charged, which is greater than the battery voltage of the battery, and stop charging when the battery ceases to accept additional current. Such charging methods do not consider the state of charge of the battery at the onset of charging, and almost always result in deleterious effects on the battery, reduces performance and battery life.

A battery charging method that minimizes overcharging, and, thus, increases battery performance and life is needed. The battery charging method should be capable of charging one or more batteries simultaneously, evaluate the state of charge of the batteries, i.e., whether the batteries are substantially charged or substantially fully depleted early during the charging cycle, and charge the batteries accordingly, based upon such state of charge.

Batteries generally consist of two or more galvanic cells. Two electrodes of dissimilar materials are isolated one form the other electronically, but placed in a common ionically conductive electrolyte. Overcharge of the battery can lead to complicated and undesirable side reactions, in particular as they pertain to the decomposition of electrolyte. The latter can lead to gas production, which in turn leads to increased battery internal impedance. The battery with this increased battery internal impedance can quickly stray from optimum operating conditions. Additionally, overcharging promotes the growth of dendrites, which in turn leads to battery shorting. On other hand, present demands upon batteries call increasingly for greater power densities, so that undercharge is also to be avoided in any charging scheme.

Silver-based batteries typically have high energy densities, i.e., high energy to weight and volume ratios, an ability to deliver energy at relatively high current drains, and high reliability, making them excellent candidates for use in next generation technologies, as well as meeting current day energy storage and delivery demands. Thus, there is a need for a battery charging method and system that minimizes the deleterious effects of overcharging.

The charging of silver-based batteries is characterized by two plateaus, reflecting the two active oxidation states of silver. The first plateau occurs as silver is transformed to monovalent silver oxide ($Ag_2O$) while the second plateau reflects the formation of divalent silver (AgO). Towards the end of charge, generally at approximately 90% of maximum capacity, the plateau transforms into a steeply rising curve and the battery begins to be overcharged. Consequently, a battery charging method and system that limits the maximum charging voltage and charging current is needed. The battery charging method and system should taper charge the battery, so as not to drive too much energy into the battery too fast, and, thus, prevent damage to the battery. Gassing, which damages the battery, should be minimized.

With the advent of more sophisticated and expensive battery systems, such as silver-based batteries and other high impedance batteries, the need arises for more advanced charging methods and systems, which prevent overcharging and damage to the batteries. This need becomes more important, especially for silver-based batteries and other high impedance batteries, which have high energy densities and require long term reliability. Such batteries may be used in spacecraft and in other applications, requiring no replacement or minimal replacement over extended periods of time. Thus, there is a need for devices and methods to facilitate charging such batteries to their maximum capabilities, with minimum or substantially no deleterious effects, and maximization of life of such batteries. The charging method and system should be inexpensive, easy to manufacture and use, small and light weight, durable, long lasting, reliable, and capable of being used in aerospace and defense applications.

Different battery charging methods and system have heretofore been known. However, none of these battery charging methods and system satisfies these aforementioned needs.
Prior Charging Methods Different charging methods and system, using shunt regulators have been disclosed.

U.S. Pat. No. 5,821,733 (Turnbull) and U.S. Pat. No. 5,747,964 (Turnbull) disclose rechargeable batteries and battery charging systems for multiple series connected battery cells which include a plurality of shunt regulators, adapted to be connected in parallel with each of the cells. The voltage of each cell is monitored during charging. When a cell is fully charged, excess charging current is shunted around the fully charged cell to enable the remaining cells to continue to charge.

Turnbull shows different embodiments of his shunt regulators. In one of Turnbull's embodiments, Turnbull simply shows shunt regulators, each in parallel with a battery cell. In another embodiment, Turnbull uses shunt regulators and field effect transistors, whose drain and source terminals are connected in parallel across each of the battery cells. Each shunt regulator is under the control of a voltage sensing circuit, which includes a differential amplifier which senses the actual cell voltage of the battery cell and compares it with a reference voltage, elsewhere in the charging circuit. In yet another embodiment, Turnbull uses a plurality of isolation switches to disconnect the battery cells from the charging circuit to prevent the battery circuit from discharging the cells when the battery charger is not being used.

U.S. Pat. No. 5,982,144 (Johnson et al) discloses a rechargeable power supply overcharge protection circuit with shunt circuits that shunt current about a battery or battery cell of a string of battery cells, when it is charged to a maximum charge limit. The shunt circuit includes shunt regulators connected across each battery cell.

U.S. Pat. No. 6,025,696 (Lenhart et al) discloses a battery cell bypass module having a sensor for detecting an operating condition of a battery cell, such as voltage or temperature, and a controller connected across the battery cell of a lithium ion battery, the controller then being operable to change to the conductive mode and thereby shunt current around the battery cell. The controller includes a voltage limiting operational amplifier operable for transmitting a voltage excessive output signal, when the input thereto exceeds a predetermined value, and a transistor having a predetermined gate voltage allowing bypass current flow, the transistor being responsive to the voltage excessive output signal from the voltage limiting operational amplifier to shunt current around the battery cell.

U.S. Pat. No. 4,719,401 (Altmejd) discloses zener diodes, each of which are shunted across each cell in a series connected string of battery cells.

Different charging methods and systems, using plateaus and inflection points have been disclosed.

U.S. Pat. No. 5,642,031 (Brotto) discloses a battery recharging system with state of charge detection, that initially detects whether a battery to be charged is already at or near full charge to prevent overcharging. A state of charge test is first performed on the battery, by applying a current pulse and then observing the voltage decay characteristics which result, batteries which are initially nearly fully charged exhibiting a larger voltage decay than batteries which are not as fully charged. The result of this initial state of charge test is used to determine how to best terminate battery charging.

U.S. Pat. No. 4,392,101 (Saar et al) and U.S. Pat. No. 4,388,582 (Saar et al) disclose a method and apparatus of fast charging batteries by means of analysis of the profile of the variation with time of a characteristic of the battery, which is indicative of the variation in stored chemical energy as the battery is charged. The method comprises analyzing the profile for the occurrence of a particular series of events, preferably including one or more inflection points, which identify the point in time at which the application of a fast charge rate should be discontinued. Additional methods of analysis provide for termination or control of the charging current, upon the occurrence of other events such as limiting values on time, voltage or voltage slope, or a negative change in the level of stored energy. The variation of the characteristic with time is analyzed, preferably by measuring successive values of the characteristic, computing the slope and comparing successive slope values so as to identify inflection points and other significant events in the variation of the characteristic. Apparatus for performing these methods comprises a power supply and a microcomputer for analyzing the profile and controlling the power supply.

Saar and Brotto show a voltage-time curve, which can be separated into at least four distinct regions. Region I represents the beginning of the charging sequence just after the battery is initially attached to the charger and the charging begins. After the charging sequence passes through region I, the charging curve will enter a more stable region II. Region II is generally the longest region of the charging sequence, and is marked by most of the internal chemical conversion within the battery itself. Because of this, the voltage of the battery does not substantially increase over region II, and thus, this region represents a plateau region in the charging curve. At the end of region II is an inflection point in the curve, which represents a transition from region II to region III, and is noted by a point where the slope of the curve changes from a decreasing rate to an increasing rate. Region III is the region in which the battery voltage begins to increase rapidly with respect to time, thus, representing a region of rapid voltage rise. As the battery voltage increases through region III to its fully charged condition, the internal pressure and temperature of the battery also increases. When the effects of temperature and pressure within the battery begin to take over, the increase in battery voltage begins to taper off. This tapering off effect is noted as another inflection point and is also characterized by the sharp fall in the voltage derivative curve dV/dt. Region IV represents the fully charged region following the latter inflection point and including the charge termination target. The charging voltage only stabilizes at the charge termination target for a very short period of time. Consequently, if charging continues, the additional heating within the battery will cause the voltage of the battery to decrease and in addition may cause damage to the battery.

U.S. Pat. No. 6,215,312 (Hoenig et al) discloses a method and apparatus for analyzing an AgZn battery, which diagnoses the status of the battery having high and low voltage plateau states corresponding to its state of charge.

Other fast charging devices and methods have been disclosed, some of which are complicated and involved.

U.S. Pat. No. 5,307,000 (Podrazhansky et al) discloses a method and apparatus, which uses a sequence of charge and discharge pulses. The discharging pulses preferably have a magnitude, which is approximately the same as the magnitude of the charging pulses, but which have a duration which is substantially smaller than the duration of the charging pulses. The discharging pulse causes a negative-going spike, which is measured and prompts the charging to stop.

U.S. Pat. No. 6,097,172 (Podrazhansky et al) discloses an apparatus and method for charging a battery in a technique wherein charge pulses are followed by discharge pulses and then first rest periods and other discharge pulses followed by second rest periods. Selected ones of the second rest periods are extended in time to enable a battery equilibrium to be established and the open circuit voltage of the battery to settle down and reflect an overcharging condition of the battery. By comparing the open. circuit voltages measured during different extended second rest periods small voltage decreases are detected and used to determine an overcharging condition, such as when gases are generated and affect the open circuit voltage. Once overcharging is detected the battery charging is stopped. U.S. Pat. No. 6,232,750 (Podrazhansky et al) also discloses another battery charger, which rapidly charges a battery utilizing a bipolar waveform.

U.S. Pat. No. 5,204,611 (Nor et al) and U.S. Pat. No. 5,396,163 (Nor et al) disclose circuits in which rechargeable batteries and cells are fast charged by a controlled current, and substantially at a rate not exceeding the ability of the battery or cell to accept current. The resistance free terminal voltage of the battery or cell is detected during an interval when the charging current is interrupted, and compared against an independent reference voltage to control the charging current when a difference between the reference voltage and the sensed resistance free terminal voltage exists.

Different charging methods and systems, using time as a factor in charging have been disclosed.

U.S. Pat. No. 6,137,268 (Mitchell et al) discloses a battery charging system in which current is averaged over a long time period (seconds) to determine the maximum average charging rate. When the integral of charging current over this long time period reaches the programmed maximum charge value for one period, current is simply cut off for the remainder of the fixed long period.

U.S. Pat. No. 6,215,291 (Mercer) discloses a control circuit, having a bandgap reference circuit, which minimizes the charging cycle time of a battery charging system, by maximizing the length of time that high constant charging current is applied to a discharged battery.

Other charging devices, batteries, and methods have been disclosed, which still do not satisfy the aforementioned needs.

U.S. Pat. No. 5,166,596 (Goedken) discloses a battery charger having a variable-magnitude charging current source. U.S. Pat. No. 6,222,343 (Crisp et al) discloses a battery charger, which is capable of charging different types of batteries, a method for charging a battery, and a software program for operating the battery charger.

U.S. Pat. No. 5,387,857 (Honda et al); U.S. Pat. No. 5,438,250 (Retzlaff); U.S. Pat. No. 6,215,291 (Ostergaard et al); U.S. Pat. No. 6,037,751 (Klang); U.S. Pat. No. 5,089,765 (Yamaguchi); U.S. Pat. No. 4,113,921 (Goldstein et al); U.S. Pat. No. 5,049,803 (Palanisamy) U.S. Pat. Nos. 5,160,880 6,124,700 (Nagai et al); (Palanisamy) U.S. Pat. No. 4,745,349 (Palanisamy); U.S. Pat. No. 5,721,688, (Bramwell); U.S. Pat. No. 6,252,373 (Stefansson); U.S. Pat. No. 5,270,635 (Hoffman et al); U.S. Pat. No. 6,104,167 (Bertness et al); U.S. Pat. No. 3,708,738 (Crawford et al); British Patent Nos. GB2178608A (Yu Zhiwei) and 892,954 (Wolff); World Patent Nos. WO00/14848 (Simmonds) and WO01/47086 (Gabehart et al); French Patent No. FR2683093-A1 (Michelle et al); and European Patent Application No. EP1076397A1 (Klang) each disclose other devices, batteries, and methods, which do not satisfy the aforementioned needs.

For the foregoing reasons, there is a need for a battery charging method and system that minimizes the deleterious effects of overcharging. and, thus, increases battery performance and life is needed. The battery charging method and system should be capable of charging one or more batteries simultaneously, evaluate the state of charge of the batteries, i.e., whether the batteries are substantially charged or substantially fully depleted early during the charging cycle, and charge the batteries accordingly, based upon such state of charge. The charging method and system should limit the maximum charging voltage and charging current applied to the battery, and should taper charge the battery, so as not to drive too much energy into the battery too fast, and, thus, prevent damage to the battery. Gassing, which damages the battery, should be minimized. With the advent of more sophisticated and expensive battery systems, such as silver-based batteries and other high impedance batteries, the need arises for more advanced charging methods and systems, which prevent overcharging and damage to the batteries. This need becomes more important, especially for silver-based batteries and other high impedance batteries, which have high energy densities and require long term reliability. Such batteries may be used in spacecraft and in other applications, requiring no replacement or minimal replacement over extended periods of time. Thus, there is a need for devices and methods to facilitate charging such batteries to their maximum capabilities, with minimum or substantially no deleterious effects, and maximization of life of such batteries. The charging method and system should be inexpensive, easy to manufacture and use, small and light weight, durable, long lasting, reliable, and capable of being used in aerospace and defense applications.

STATEMENT OF THE INVENTION

The present invention is directed a battery charging method and system that minimizes the deleterious effects of overcharging, thus, increases battery performance and life. The battery charging method and system is capable of charging one or more batteries simultaneously, evaluating the state of charge of the batteries, i.e., whether the batteries are substantially charged or substantially fully depleted early during the charging cycle, and charging the batteries accordingly, based upon such state of charge. The charging method and system limits the maximum charging voltage and charging current applied to the battery, and taper charges the battery, so as not to drive too much energy into the battery too fast and, thus, preventing damage to the battery. Gassing, which damages the battery, is minimized. With the advent of more sophisticated and expensive battery systems, such as silver-based batteries and other high impedance batteries, the need arises for more advanced charging methods and systems, which prevent overcharging and damage to the batteries. This need becomes more important, especially for silver-based batteries and other high impedance batteries, which have high energy densities and require long term reliability. Such batteries may be used in spacecraft and in other applications, requiring no replacement or minimal replacement over extended periods of time. Thus, there is a need for devices and methods to facilitate charging such batteries to their maximum capabilities, with minimum or substantially no deleterious effects, and maximization of life of such batteries. The charging method and system of the present invention limits the maximum charging voltage and charging current applied to the battery, and taper charges the battery. Additionally, the method and system are inexpensive, easy to manufacture and use, small and light weight, durable, long lasting, reliable, and capable of being used in aerospace and defense applications, and satisfy the aforementioned needs.

A battery charging method having features of the present invention comprises: charging at least one battery at a first voltage for a first time duration; determining state of charge of the batteries at the end of the first time duration; if the batteries are substantially fully charged at the end of the first time duration, charging the batteries at the first voltage for a second time duration, and charging the batteries at a second voltage for a third duration of time; if the batteries are substantially fully depleted at the end of the first time duration, charging the batteries at the first voltage for an alternate second time duration, and charging the batteries at the second voltage for an alternate third duration of time.

A battery charging system having features of the present invention comprises: a current source; a cutoff voltage controller and timer; at least one battery; and respective ones of voltage and current regulators, which regulate voltages applied to each of the respective ones of the batteries and current supplied to the respective batteries, the cutoff voltage controller and timer controlling the voltages and controlling time durations of the voltages applied to each of the respective ones of the batteries therethrough control of the voltage and current regulators.

The battery charging method and system regulates the current flow supplied to the battery, which originates from a constant charging current source. The battery charging method and system shapes the current supplied to the batteries, and may be used to taper the current supplied to the batteries.

These and other features, aspects, and advantages of the present invention will become better understood with regard to the following description, appended claims, and accompanying drawings where:

DETAILED DESCRIPTION

The preferred embodiments of the present invention will be described with reference to FIGS. 1–12 of the drawings. Identical elements in the various figures are identified with the same reference numbers.

Figure 1:
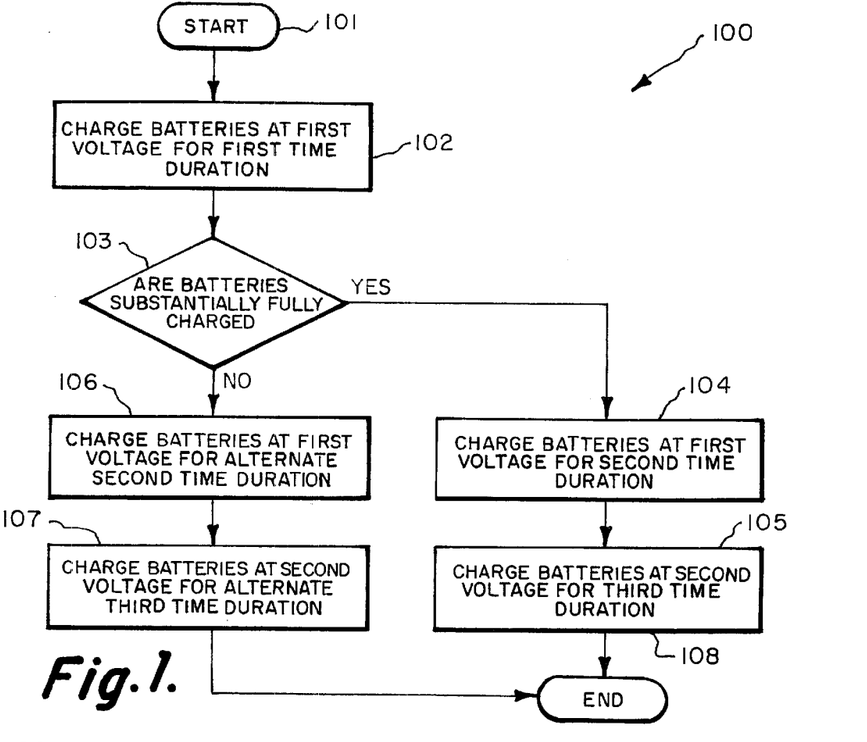
FIG. 1 is a schematic representation of the steps of a battery charging method according to the present invention.

FIG. 1 shows steps of a method of charging batteries 100 of the present invention. The method of charging batteries 100 starts at step 101. Batteries to be charged are charged at a first voltage for a first time duration at step 102. At the end of the first time duration, the batteries are evaluated to determine state of charge, i.e., whether the batteries substantially fully charged, or whether the batteries substantially depleted of charge, at step 103. If the batteries are determined to be substantially fully charged at the end of the first time duration, at step 103, the batteries are charged at the first voltage for a second time duration, at step 104. The batteries are then charged at a second voltage for a third time duration, at step 105. If the batteries are determined to be not substantially fully charged at the end of the first time duration, at step 103, i.e., the batteries are substantially fully depleted at the end of the first time duration, the batteries are charged at the first voltage for an alternate second time duration, at step 106. The batteries are then charged at the second voltage for an alternate third time duration, at step 107. The method of charging batteries 100 ends at step 108.

Figure 2:
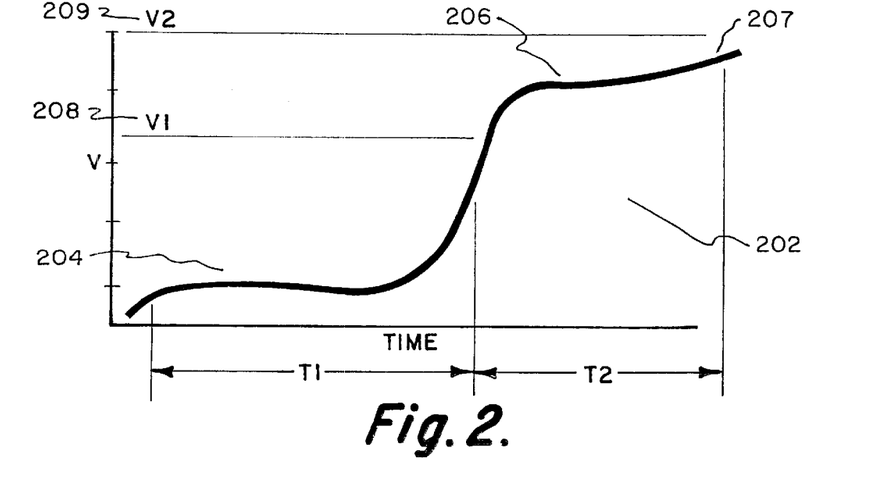
FIG. 2 is a graphical representation of a battery charging profile.

FIG. 2 shows a typical charging profile 202 of a silver-based battery, illustrating battery voltage as a function of time, during charging, reflecting the two active oxidation states of silver. Silver-based batteries typically have two plateaus. The first plateau 204, called the "plateau region," occurs as silver is transformed to monovalent silver oxide ($Ag_2O$), and typically has less than 4% voltage variation per 10% change in battery capacity. Silver in the battery is converted to monovalent silver oxide within the "plateau region." As the battery is charged further, the battery reaches a second plateau 206, which indicates formation of a divalent silver species (AgO). Towards the end of charge, generally at approximately 90% of maximum capacity, the plateau transforms into a steeply rising curve 207, and the battery begins to be overcharged. Other plateaus may exist depending on battery chemistry and other parameters.

The following empirical observations are presented herewith and disclosed as relevant and part of the teachings of the present invention, and are applicable to the method of charging batteries 100 of the present invention, shown in FIG. 1. These empirical observations are particularly relevant to silver based batteries.

The total time required to charge a silver based battery may be defined as $T_{total}=C/Icc$, where C is the capacity of the battery, and Icc is the value of the charging current supplied to the battery. The total time $T_{total}$ may be defined as having time durations, such as, for example, a first time duration T1, a second time duration T2, and a third time duration T3. The first time duration T1 may be defined as the time duration from commencement of charging at a first voltage until the battery is evaluated to determine if the battery is substantially fully charged or substantially fully depleted, as previously described. The second time duration T2 may be defined as the time duration from the end of the first time duration T1, until the beginning of the third time duration, while charging at the first voltage. The time duration T3 is defined as the time duration at which the battery is charged at a second voltage, after the end of the second time duration T2, until the end of charging. The total time $T_{total}$ required to charge the battery is, thus, the sum of the first time duration T1, the second time duration T2, and the third time duration T3; the total time $T_{total}=T1+T2+T3$.

Further to the above empirical observations and teachings of the present invention, battery charging may be optimized:

1) for batteries starting out close to full charge: by charging the battery at the first voltage for a time duration $T_{v1}$, which is substantially equal to the sum of the first time duration T1 and the second time duration T2, until the beginning of the third time duration T3, and then charging the battery at the second voltage for the third time duration T3 for a time preferably approximately one fifth the time duration $T_{v1}$ of the sum of the first time duration T1 and the second time duration T2;

2) for batteries starting out at a relatively depleted state of charge: by charging the battery at the first voltage for an alternate time duration $T_{v1'}$, which is substantially equal to the sum of the first time duration T1 and an alternate second time duration T2', until the beginning of an alternate third time duration T3', and then charging the battery at the second voltage for the alternate third time duration T3' for a time preferably approximately half the alternate time duration $T_{v1'}$ of the sum of the first time duration T1 and the alternate second time duration T2';

3) the first voltage being substantially equal to the Voltage V1 (208), which is a voltage between the first plateau 204 and the second plateau 206 of the charging profile 202;

4) the second voltage being substantially equal to the Voltage V2 (209), which is a voltage on or slightly above the second plateau, typically prior to the steeply rising curve 207 of the charging profile 202;

5) more specifically, charging the battery at the first voltage, which is substantially equal to the Voltage V1 (208), which is a voltage between the first plateau 204 and the second plateau 206 of the charging profile 202, and selecting the first time duration T1 from the commencement of charging, as the time duration δ, defined as $δ=ψC/Icc$, with $0.05<ψ<0.10$;

6). selecting the second time duration T2 from the end of the first time duration T1 until the beginning of the third time duration T3 substantially as $T2=αC/Icc$, with $0.70<α<0.80$, and selecting the third time duration T3 substantially as $T3=PT2$ with $0.15<β<0.25$;

7). selecting the alternate second time duration T2' from the end of the first time duration T1 until the beginning of the alternate third time duration T3' substantially as $T2'=α'C/Icc$, with $0.55<α'<0.65$, and selecting the alternate third time duration T3' substantially as $T3'=β'T2'$ with $0.15<β'<0.25$; and 8). the total time required to charge a silver based battery being defined as $T_{total}=C/Icc$, where C is the capacity of the battery, and Icc is the value of the charging current supplied to the battery, where the total time $T_{total}$ required to charge the battery is the sum of the first time duration T1, the second time duration T2, and the third time duration T3; the total time $T_{total}=T1+T2+T3$;

9). particular attention being paid to the time duration T3 or the alternate time duration T3', which is substantially the time in which a respective one of the batteries B1 (218) is charged at the second plateau 206 of the charging profile 202, since it is at the second plateau 206 that gassing starts to occur, if the battery is charged for too long a period of time.

The method of charging batteries 100 of the present invention may, thus, be optimized for silver zinc batteries by using the above disclosed values.

Again, the method of charging batteries 100 starts at step 101, as shown in FIG. 1. The silver based batteries are, thus, preferably charged at the first voltage being substantially equal to the Voltage V1 (208), which is a voltage between the first plateau 204 and the second plateau 206 of the charging profile 202, for the first time duration T1 from the commencement of charging, as $T1=ψC/Icc$, with $0.05<ψ<0.10$, at step 102. At the end of the first time duration T1, the batteries are evaluated to determine state of charge, i.e., whether the batteries substantially fully charged, or whether the batteries substantially depleted of charge, at step 103. If the batteries are determined to be substantially fully charged at the end of the first time duration T1, at step 103, the batteries are preferably charged at the first voltage for the second time duration T2, which is the time duration from the end of the first time duration T1 until the beginning of the third time duration T3, substantially as $T2=αC/Icc$, with $0.55<α<0.65$, at step 104. The batteries are then charged at the second voltage which is substantially equal to the Voltage V2 (209), which is a voltage on or slightly above the second plateau, typically prior to the steeply rising curve 207 of the charging profile 202, for the third time duration $T3=βT2$ with $0.45<β<0.55$, at step 105. If the batteries are determined to be not substantially fully charged at the end of the first time duration, at step 103, i.e., the batteries are substantially fully depleted at the end of the first time duration, the batteries are preferably charged at the first voltage, which is substantially equal to the Voltage V1 (208), for the alternate second time duration $T2'=αC/Icc$ with $0.70<α<0.80$, at step 106. The batteries are then charged at the second voltage, which is substantially equal to the Voltage V2 (209), for the alternate third time duration $T3'=β'T2'$ with $0.15<β'<0.25$, at step 107. The method of charging batteries 100 ends at step 108.

The steps of the method of charging batteries 100 of the present invention may be controlled by a cutoff voltage controller, which may be a microcontroller, a computer, or other suitable device.

Figure 3:
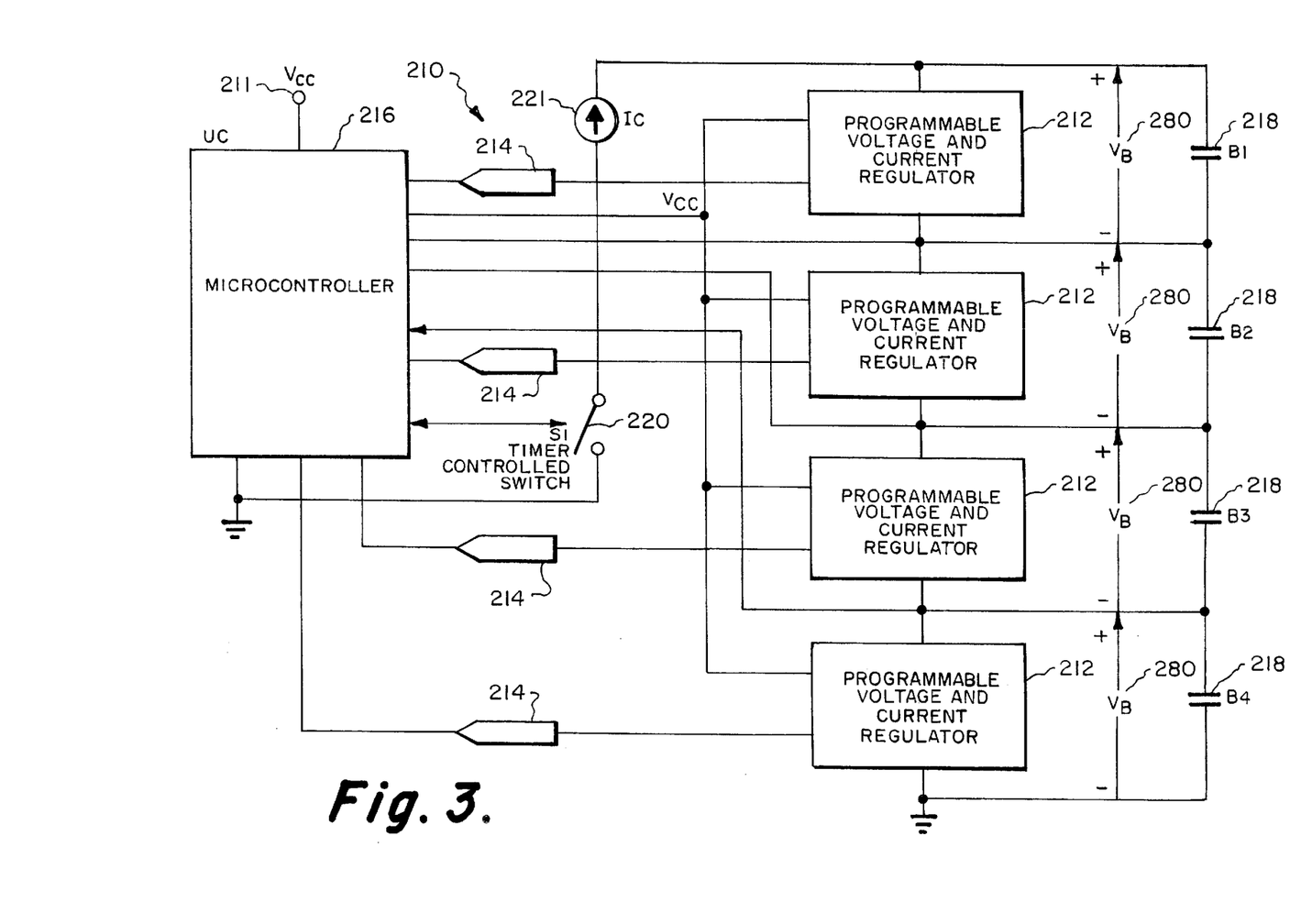
FIG. 3 is a block diagram of a battery charging system, constructed in accordance with the present invention.

FIG. 3 shows a block diagram of an embodiment of the present invention, a battery charging system 210, which is different from the battery charging system 400 of copending application, entitled "Battery Charging System," by inventors Michael Cheiky and Te-Chien Felix Yang, Ser. No. 10/022,450, filed Dec. 17, 2001, referenced above, i.e., each programmable voltage and current regulator 212 of the battery charging system 210 of the present invention has Control 1 voltage inputs 214, and is shown with a cutoff voltage controller and timer 216, which may be a microcontroller, from which the Control 1 voltage inputs 214 and voltage reference inputs $V_{cc}$ (217) may be derived.

The battery charging system 210 of the present invention regulates voltage applied to each of batteries B1 (218) and regulates, shapes, and shunts current supplied to each of the batteries B1 (218) at appropriate voltages via the use of the programmable voltage and current regulators 212, while in series and without disconnecting batteries B1 (218) from the battery charging system 210.

The battery charging system 210 may have a plurality of cutoff voltages, which may be input into the Control 1 voltage inputs 214 and the voltage reference inputs $V_{cc}$ (217), depending on the number of plateaus that are selected to be regulated and the types of the batteries B1 (218), which to be charged. The batteries B1 (218) may be the same and/or different types of batteries, having the same and/or different characteristics. The batteries B1 (218), thus, may have the same and/or different electrical characteristics chemical characteristics, and/or physical characteristics. The battery charging system 210 may have a plurality of the batteries B1 (218) to be charged and a plurality of the programmable voltage and current regulators 212.

Timer controlled switch S1 (220), which may be controlled by the cutoff voltage controller and timer 216 is in series with current source $I_C$ (221), a plurality of the batteries B1 (218) which are in series, and a plurality of the programmable voltage and current regulators 212 which are in series. Each respective one of the programmable voltage and current regulators 212, across a respective one of the batteries B1 (218), regulates voltage applied to and current supplied to each of the respective ones of the batteries B1

(218). Each of the programmable voltage and current regulators 212 may be individually programmed to accept a variety of charging methods and processes.

Figure 4:
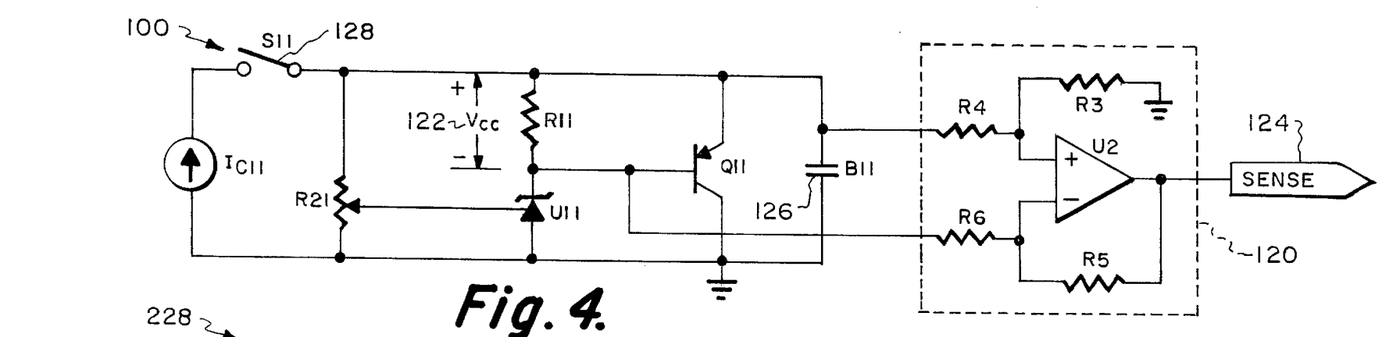
FIG. 4 is a schematic diagram of a cutoff voltage controller and timer, constructed in accordance with the present invention.

FIG. 4 shows a typical one of the programmable voltage and current regulators 212 having the Control 1 voltage inputs 214 and the voltage reference input $V_{cc}$ (217), which may be communicated from the cutoff voltage controller and timer 216. The Control 1 voltage inputs 214 may be derived within the cutoff voltage controller and timer 216 or may be input directly, either manually or from an external source. The voltage reference input $V_{cc}$ (217), although shown in FIG. 3 being input through the cutoff voltage controller and timer 216 and controlled by the cutoff voltage controller and timer 216, may also be derived within the cutoff voltage controller and timer 216 or may be input directly, either manually or from an external source.

Figure 5:
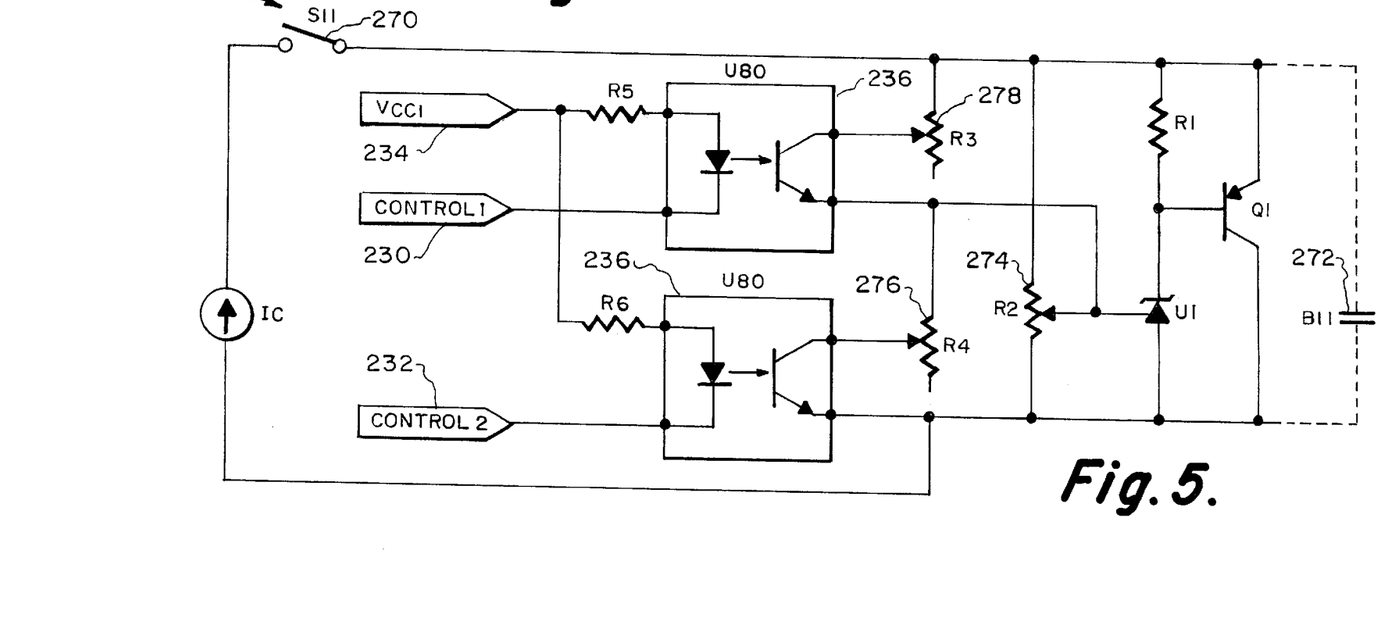
FIG. 5 is a schematic diagram of an alternate embodiment of a cutoff voltage controller and timer, constructed in accordance with the present invention.

FIG. 5 shows an alternate embodiment of a programmable voltage and current regulator 228, having a plurality of the of cutoff voltages inputs, shown as Control 1 voltage input 30, Control 2 voltage input 32, and voltage reference input $V_{cc1}$ (234). The number of cutoff voltages may be increased by simply adding additional optoisolators U60 (236), accompanying resistors and potentiometers, and calibrating the programmable voltage and current regulator 228, accordingly. The number of cutoff voltages of each of the programmable voltage and current regulators 228 is one more than the number of optoisolators U60 (236) used in each of the programmable voltage and current regulators 228.

Each of the programmable voltage and current regulators 212 and 228 shown in FIGS. 4 and 5 are disclosed in copending application, entitled "Battery Charging System," by inventors Michael Cheiky and Te-Chien Felix Yang, Ser. No. 10/022,450, filed Dec. 17, 2001, although other suitable voltage and current regulators may be used, and are summarized herein below briefly, which will aid in an understanding of various teachings of the present invention.

FIG. 4 shows a typical one of the programmable voltage and current regulators 212 having the Control 1 voltage input 214 and the voltage reference input $V_{cc}$ (217). The programmable voltage and current regulator 212 has an optoisolator U50 (250). The current that arises from a voltage difference between the voltage at the Control 1 voltage input 214 and the voltage reference input $V_{cc}$ (217) flows through limiting resistor R4 (252), which activates the optoisolator U50 (250), and results in potentiometer resistor R3 (254) being in parallel with upper portion 256 of potentiometer resistor R2 (258). The potentiometer resistor R3 (254) has a large resistance compared with the resistance of the upper portion 256 of the resistor R2 (258). The effective resistance coupled to adjustable band-gap voltage reference diode U1 (260) is reduced, thus providing an offset to zener reference voltage $V_{REF}$ (262) of the adjustable band-gap voltage reference diode U1 (260). Consequently, depending on the value of the voltage at the Control 1 voltage input 214, two cutoff voltages may be used in the battery charging system 210.

The cutoff voltages may be programmed to change as a function of time or may be changed, as a result of other instructions, may have fixed values, or may be changed manually, depending upon the needs of the battery charging system 210. The cutoff voltages may, for example, be set to the voltage V1 (208), between the first plateau 204 and the second plateau 206 of the charging profile 202, and the Voltage V2 (209), slightly above the second plateau, typically prior to the steeply rising curve 207. The voltages at the Control 1 voltage inputs 214 of each of the programmable voltage and current regulators 212 of the battery charging system may alternatively be set to different of cutoff voltages, depending on the needs of the battery charging system 210 and the types of the batteries B1 (218) being charged.

Now, again referring to FIGS. 3 and 4, each of the programmable voltage and current regulators 212 limits the voltages, or cutoff voltages, to which each of the respective batteries B1 (218) may be charged. The voltages, or cutoff voltages to which the programmable voltage and current regulators are typically set are shown in FIG. 2. Voltage V1 (208), for example, may be the voltage between the first plateau 204 and the second plateau 206 of the charging profile 202. For silver-zinc batteries, the voltage V1 (208) is typically in the range of 1.65 to 1.98 volts and is preferably 1.87 volts. For silver-cadmium batteries, the voltage V1 (208) is typically in the range of 1.25 to 1.40 volts, and preferably 1.35 volts, but other suitable values may be used. The voltage V2 (209), for example, may be a voltage on or slightly above the second plateau, typically prior to the steeply rising curve 207. For silver-zinc batteries, the voltage V2 (209) is in the range of 1.90 to 2.10 volts and is preferably 1.98 volts, however, other suitable values may be used. For silver-cadmium batteries, the voltage V2 (209) may be in the range of 1.50 to 1.65 volts, and preferably 1.55, although other suitable values may be used.

Figure 6:
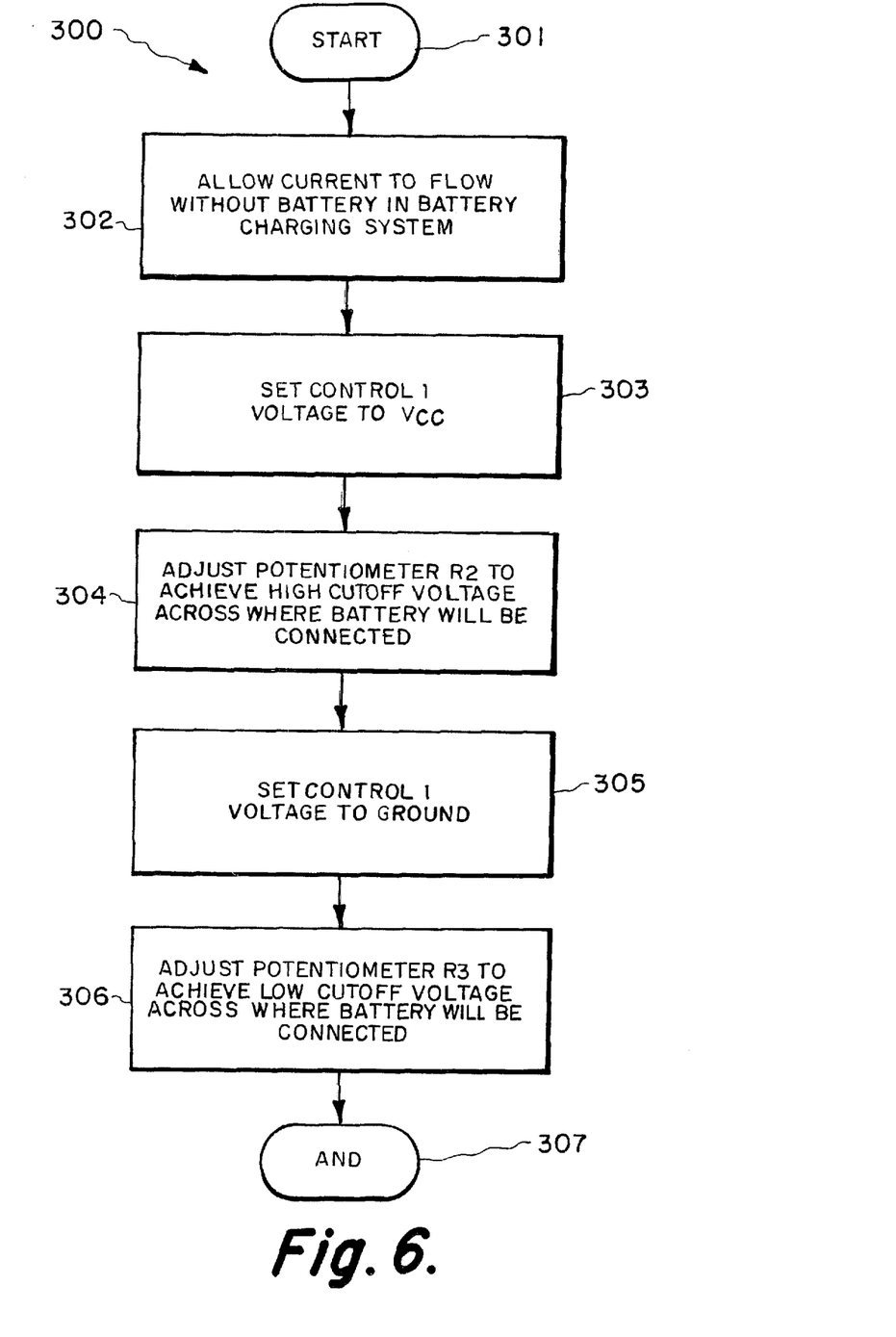
FIG. 6 is a schematic representation of steps of a method of calibrating the programmable voltage and current regulator of FIG. 4.

FIG. 6 shows steps of a method 300 of calibrating each of the programmable voltage and current regulators 212 of FIGS. 3 and 4 for use with two cutoff voltages, i.e., calibrating the Control 1 voltage inputs 214 of each of the programmable voltage and current regulators 212 for use with two cutoff voltages. The method of calibrating each of the programmable voltage and current regulators 212 starts at step 301. Current is allowed to flow without the battery B1 (218) in the battery charging system 210, by setting the timer controlled switch S1 (220) to on (step 302); the voltage at the Control 1 voltage input 214 is then set to a high voltage $V_{HIGH}$, associated with logic high (step 303); the potentiometer R2 (258) is then adjusted to achieve a high cutoff voltage, associated with the logic high and the high voltage $V_{HIGH}$, across where the battery B1 (218) is to be connected (step 304); the voltage at the Control 1 voltage input 214 is then set to low voltage $V_{LOW}$, associated with logic low (step 305); and the potentiometer resistor R3 (254) is then adjusted to achieve a low cutoff voltage, associated with the logic low and the low voltage $V_{LOW}$, across where the battery B1 (218) will be connected (step 306). The method of calibrating each of the programmable voltage and current regulators 212 ends at step 307, after which the battery B1 (218) may be connected to a respective one of the voltage and current regulators 212.

Setting the voltage at the Control 1 voltage input 214 to $V_{LOW}$, associated with the logic low, during charging will then yield the voltage $V_{LOW}$, associated with the logic low, across where the battery B1(218) is connected; and/or setting the voltage at the Control 1 voltage input 214 to $V_{HIGH}$, associated with the logic high, during charging will then yield the voltage $V_{HIGH}$, associated with the logic high, across where the battery B1 (218) is connected.

Figure 7:
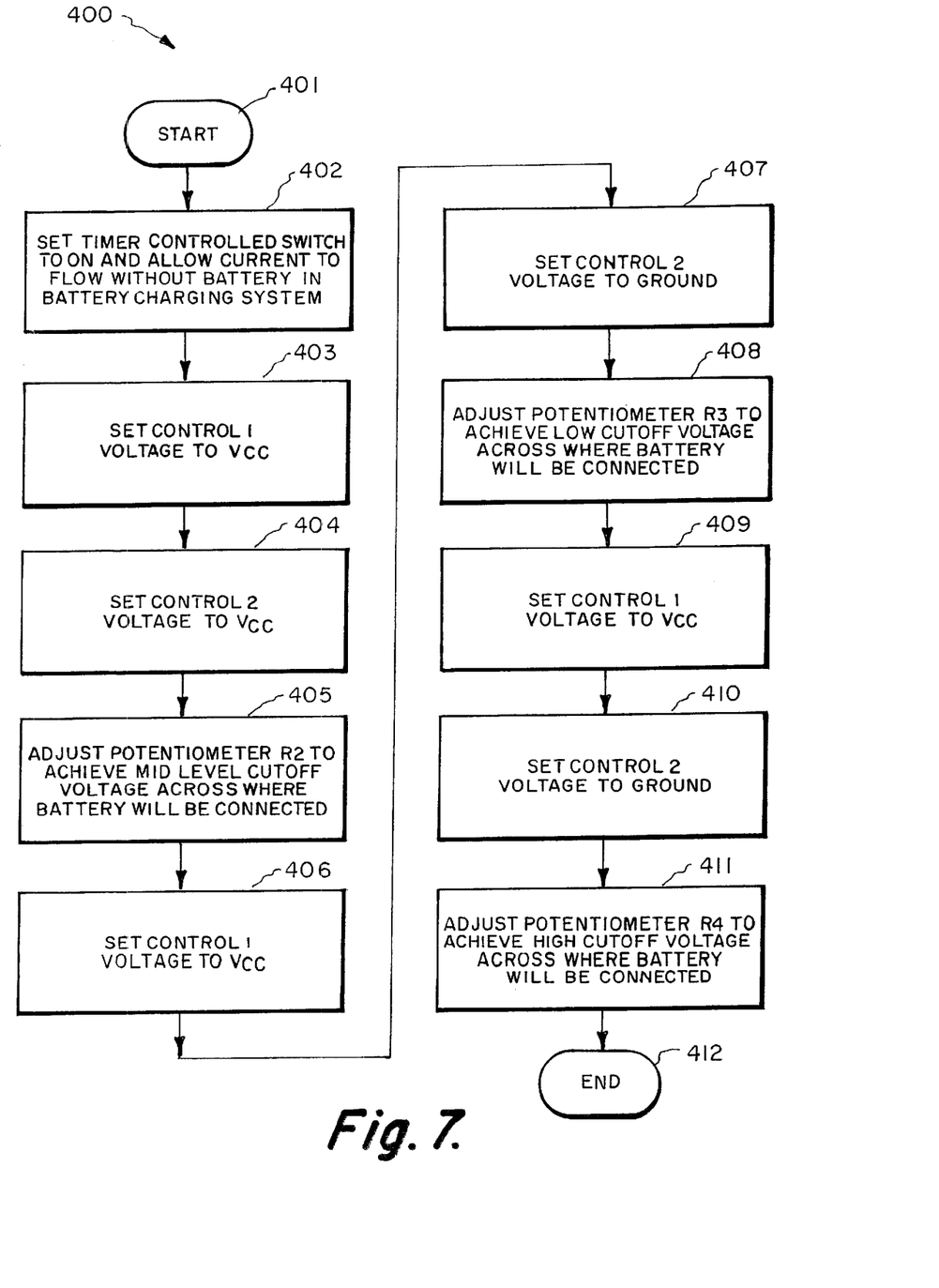
FIG. 7 is a schematic representation of steps of a method of calibrating the programmable voltage and current regulator of FIG. 5.

A method 400 of calibrating each of the programmable voltage and current regulators 228 of FIG. 5, i.e., calibrating the Control 1 voltage inputs (230) and the Control 2 voltage inputs (232) of each of the programmable voltage and current regulators 228 for use with a plurality of cutoff voltages, is substantially the same as the method 300 of calibrating each of the programmable voltage and current regulators 212, except that additional steps may be added, which may be used to calibrate the Control 2 voltage input 32, and so on, of each of the programmable voltage and current regulators 228, as shown in FIG. 7.

The method 400 of calibrating each of the programmable voltage and current regulators 228 starts at step 401. Current is allowed to flow without the battery B11 (272) in the battery charging system 210 by setting the timer controlled switch S11 (270) to on (step 402); the voltage at the Control 1 voltage input (230) is then set to a high voltage $V_{HIGH}$, associated with logic high, (step 403); the Control 2 voltage input (232) is then set to low voltage $V_{LOW}$, associated with logic low (step 404); potentiometer R2 (274) is then adjusted to achieve a mid level cutoff voltage, associated with a mid level voltage $V_{MID}$, across where the battery B11 (272) is to be connected (step 405); the voltage at the Control 1 voltage input (230) is then again set to a high voltage $V_{HIGH}$, associated with logic high, (step 406); the Control 2 voltage input (232) is then again set to low voltage $V_{LOW}$, associated with logic low (step 407); potentiometer resistor R3 (278) is then adjusted to achieve a low cutoff voltage, associated with the logic low and the low voltage $V_{LOW}$, across where the battery B11 (272) will be connected (step 408); the voltage at the Control 1 voltage input (230) is then once again set to a high voltage $V_{HIGH}$, associated with logic high, (step 409); the Control 2 voltage input (232) is then once again set to low voltage $V_{LOW}$, associated with logic low (step 410); potentiometer resistor R4 (278) is then adjusted to achieve a high cutoff voltage across where the battery B11 (272) will be connected (step 411). The method of calibrating each of the programmable voltage and current regulators 228 ends at step 412, after which the battery B11 (272) may be connected to a respective one of the voltage and current regulators 228.

It should be noted that steps 403 and 404 may alternatively be performed in reverse order or substantially simultaneously. Likewise, steps 406, and 407 may alternatively be performed in reverse order or substantially simultaneously, and steps 409 and 410 may alternatively be performed in reverse order or substantially simultaneously.

Figure 8:
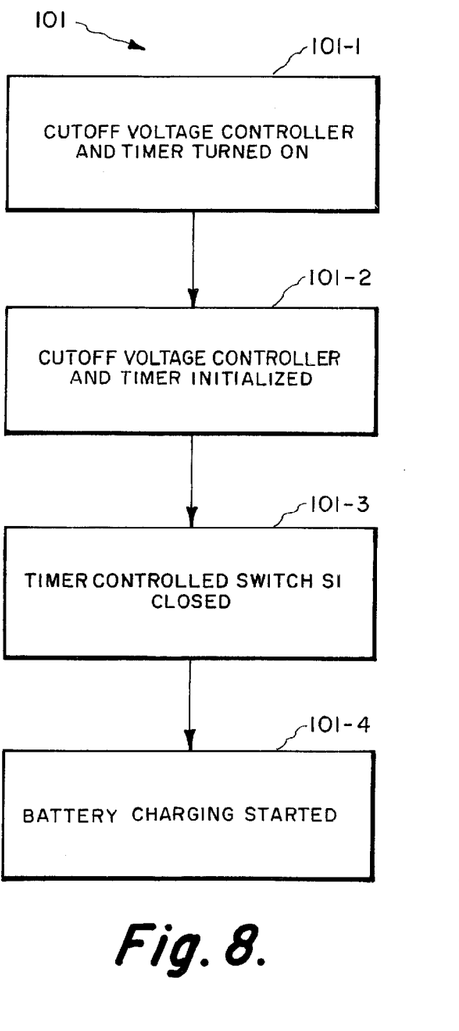
FIG. 8 is a schematic representation of details of a step of the battery charging method of the present invention of FIG. 1.
Figure 9:
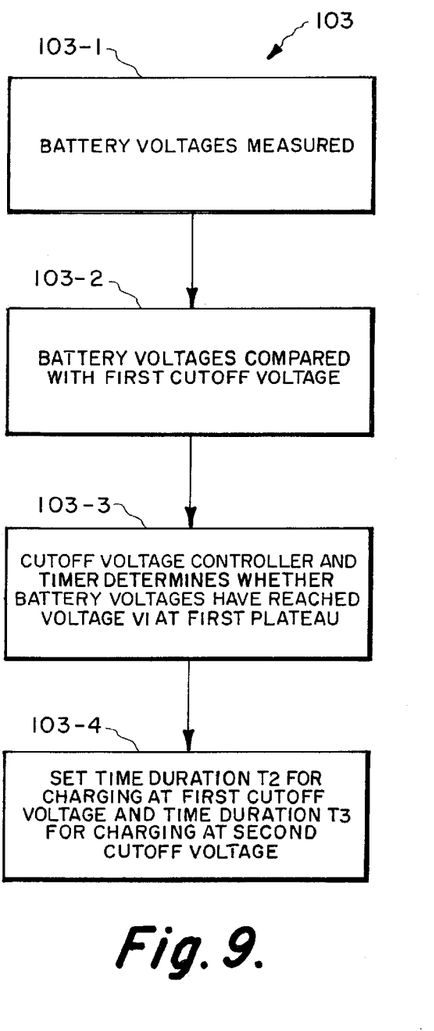
FIG. 9 is a schematic representation of details of another step of the battery charging method of the present invention of FIG. 1.

The batteries B1 (218) or the batteries B11 (272) may be charged, respectively, in accordance with the steps outlined later, and shown in FIGS. 1, 8 and 9.: once the method 300 of calibrating each of the programmable voltage and current regulators 212 of FIG. 6 for use with two cutoff voltages, i.e., calibrating the Control 1 voltage inputs 214 of each of the programmable voltage and current regulators 212 for use with two cutoff voltages is complete; or once the method 400 of calibrating each of the programmable voltage and current regulators 228 of FIG. 7, i.e., calibrating the Control 1 voltage inputs (230) and the Control 2 voltage inputs (232) of each of the programmable voltage and current regulators 228 for use with a plurality of cutoff voltages is complete.

Now, again, as shown in FIG. 3, the timer controlled switch S1 (220), which may be controlled by the cutoff voltage controller and timer 216 is in series with the current source $I_C$ (221), a plurality of the batteries B1 (218) which are in series, and a plurality of the programmable voltage and current regulators 212 which are in series. Each respective one of the programmable voltage and current regulators 212, across a respective one of the batteries B1 (218), regulates voltage applied to and current supplied to each of the respective ones of the batteries B1 (218). Each of the programmable voltage and current regulators 212, may be individually programmed to accept a variety of charging methods and processes. It should, thus, be recognized, that each of the batteries B1 (218) may be the same and/or different, i.e. the batteries B1 (218) may of the same and/or different types, and have the same and/or different characteristics, and may be charged using the same and/or different cut off voltages and charging times.

The cutoff voltage controller and timer 216, which may be a microcontroller, may be used to keep track of the time involved in charging the batteries B1 (218), control the timer controlled switch S1 (220), and control the cutoff voltages and the voltage reference input $V_{cc}$ (217) supplied to the programmable voltage and current regulators 212.

The battery charging system 210 of the present invention may perform steps of a process of charging at least one battery. FIGS. 1, 8, and 9 show steps of the method of charging batteries 100 of the present invention, as the method of charging batteries 100 is applied to the battery charging system 210 or other suitable battery charging systems. Certain ones of the steps of the method of charging batteries 100 are broken down into details or smaller steps in FIGS. 8 and 9, which may be incorporated into the steps of the method of charging batteries 100. The first three numerals of the steps shown in FIGS. 8 and 9 are associated with the steps with the same numerals in FIG. 1.

Now, again the method of charging batteries 100 starts at step 101. The cutoff voltage controller and timer 216 is turned on at step 101-1, after each of the programmable voltage and current regulators 212 are calibrated, as shown in FIG. 6 and previously described. The cutoff voltage controller and timer 216 is initialized at step 101-2. The cutoff voltage controller and timer 216 sets the Control 1 voltage inputs 214 of each of the programmable voltage and current regulators 212 to the first cutoff voltage, which is the Voltage V1 (208) at the first plateau 204 of the charging profile 202, sets the voltage reference input $V_{cc}$ (217) to the programmable voltage and current regulators 212, and starts a timer within the cutoff voltage controller and timer 216, as part of the initialization step 101-2. The cutoff voltage controller and timer 216 then closes the timer controlled switch S1 (220) at step 101-3, which starts current flowing from the current source $I_C$ (221), and starts the battery charging system 210 charging the batteries B1 (218) at step 101-4. Charging is started, based upon the aforementioned teachings of the present invention, at the first voltage, which is the Voltage V1 (208) at the first plateau 204 of the charging profile 202.

The batteries B1 (218) are charged at the first voltage being substantially equal to the Voltage V1 (208), which is a voltage between the first plateau 204 and the second plateau 206 of the charging profile 202, for the first time duration T1 from the commencement of charging, as T1=ψC/Icc, with 0.05<ψ<0.10, at step 102.

At the end of the first time duration T1, the batteries are evaluated to determine state of charge, i.e., whether the batteries substantially fully charged, or whether the batteries substantially depleted of charge, at step 103. The voltages at each of the batteries (218) measured at step 103-1, the cutoff voltage controller and timer 216 having analog to digital converters therein, which convert each of the battery voltages VB (280) received therefrom each of the batteries B1 (218) to digital signals acceptable to the cutoff voltage controller and timer 216, which may be a microcontroller. The digital signals, which represent the battery voltages VB (280) at each of the batteries (218) are compared within the cutoff voltage controller and timer 216, with the digitized first voltage, which is substantially equal to the Voltage V1 (208) at step 103-2. The cutoff voltage controller and timer 216 determines whether the battery voltage VB (280) at each of the batteries B1 (218) have reached the Voltage V1 (208) at the first plateau 204 of the charging profile 202 at step 103-3; and then sets the time duration T2 for charging at the first cutoff voltage, and the time duration T3 for charging at the second cutoff voltage, at step 103-4.

If the batteries B1 (218) have reached the Voltage V1 (208) at the first plateau 204 of the charging profile 202 at the end of the first time duration T1, as determined at step 103-3, the batteries B1 (218) are considered to be substantially fully charged, and the batteries B1 (218) are charged at the first voltage for the second time duration T2, as T2=$\alpha$C/Icc, with 0.60<$\alpha$<0.70, at step 104, as set by the cutoff voltage controller and timer 216.

The batteries are then charged at the second voltage which is substantially equal to the Voltage V2 (209), which is a voltage on or slightly above the second plateau, typically prior to the steeply rising curve 207 of the charging profile 202, for the third time duration T3=$\beta$T2 with 0.40<$\beta$<0.50, at step 105, the voltage Voltage V2 (209) and the time duration T3 being set by the cutoff voltage controller and timer 216 within step 105.

If the batteries B1 (218) have not reached the Voltage V1 (208) at the first plateau 204 of the charging profile 202 at the end of the first time duration T1, as determined at step 103-3, the batteries B1 (218) are considered to be not substantially fully charged at the end of the first time duration, at step 103, i.e., the batteries are substantially fully depleted at the end of the first time duration, the batteries are charged at the first voltage, which is substantially equal to the Voltage V1 (208), for the alternate second time duration T2'=$\alpha$'C/Icc with 0.80<$\alpha$<0.90, at step 106, as set by the cutoff voltage controller and timer 216.

The batteries are then charged at the second voltage, which is substantially equal to the Voltage V2 (209), for the alternate third time duration T3'=$\beta$'T2' with 0.20<$\beta$'<0.30, at step 107, the voltage Voltage V2 (209) and the time duration T3 being set by the cutoff voltage controller and timer 216 within step 107. The method of charging batteries 100 ends at step 108.

Figure 10:
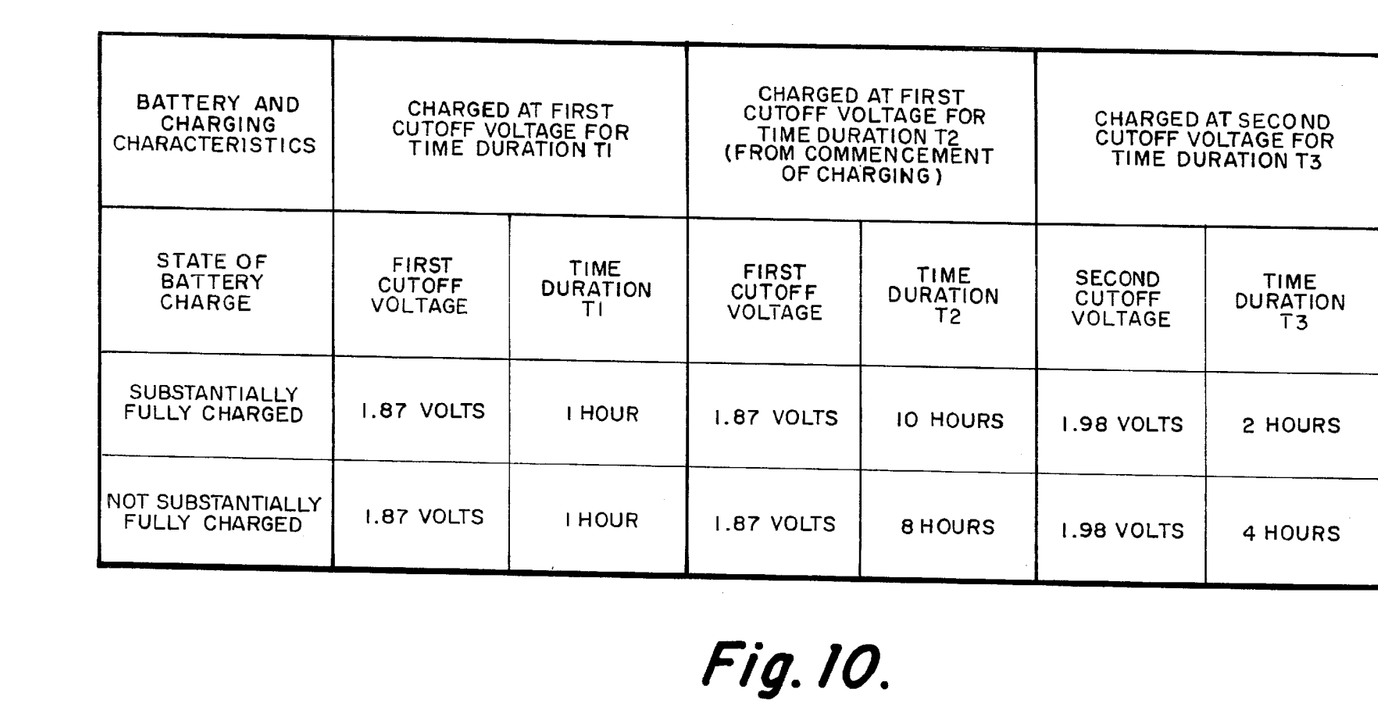
FIG. 10 is a table of typical charging voltage and time durations for batteries having different states of charge.
Figure 11:
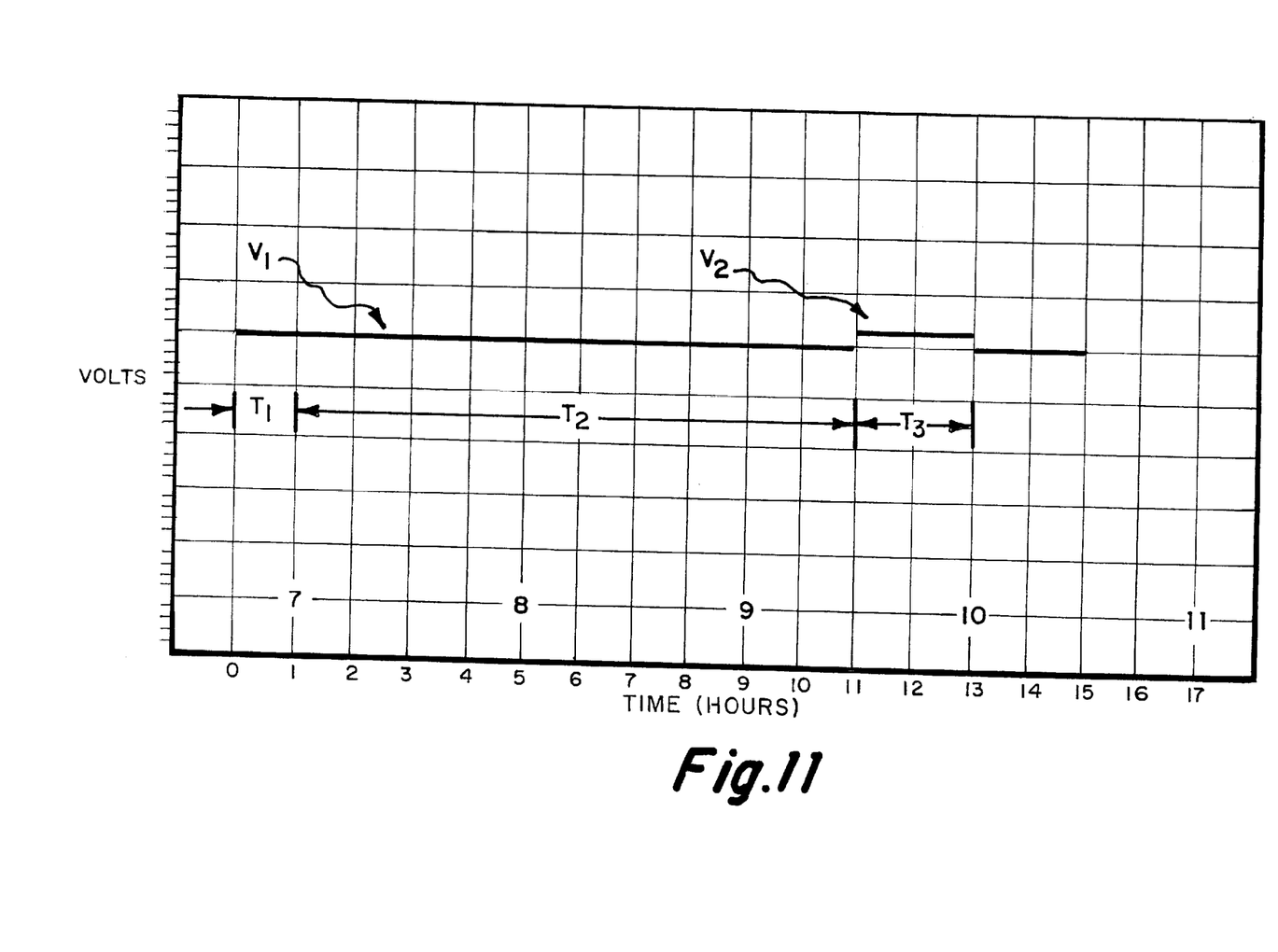
FIG. 11 is a graphical representation of an actual battery charging profile for a battery at a particular state of charge.
Figure 12:
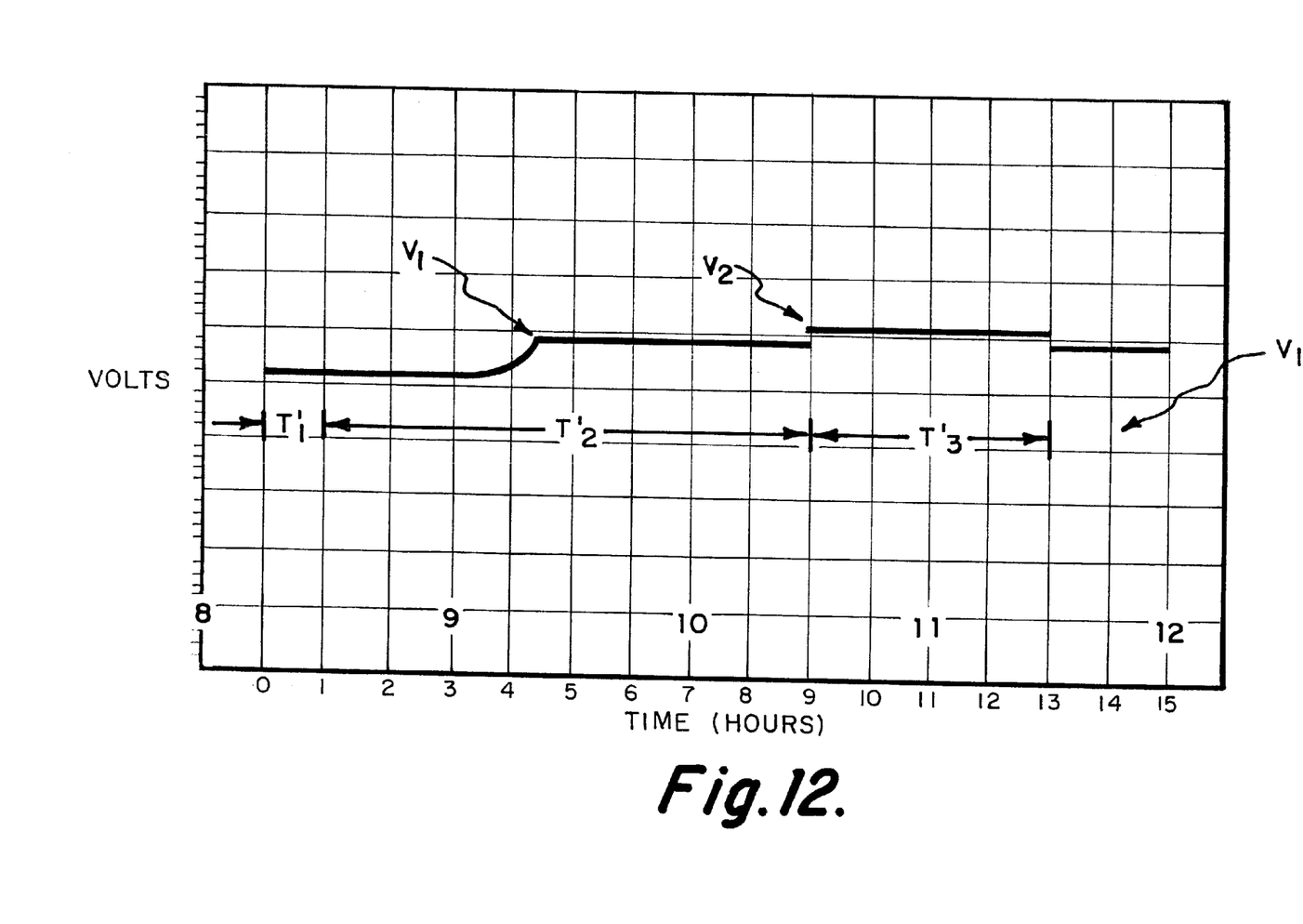
FIG. 12 is a graphical representation of an actual battery charging profile for a battery at a different state of charge than FIG. 11.

FIG. 10 is a table of typical charging voltages and time durations for a typical 3.0 watt-hour silver zinc batteries having different states of charge, which are also presented graphically in FIGS. 11 and 12.

FIG. 11 is an actual battery charging profile of a typical 3.0 watt-hour silver zinc battery at a particular state of charge, starting out substantially fully charged, showing results of charging with the method of charging batteries 100 of the present invention and the battery charging system 210 of the present invention.

The battery charging profile of FIG. 11 shows the battery at the first cutoff voltage during and at the end of the first time duration T1, which is one hour, indicating that the battery is substantially fully charged. The battery, thus, continues to be charged at the first cutoff voltage, which is 1.87 volts, for the second time duration T2, which is 10 hours. The cutoff voltage is then raised to the second cutoff voltage, which is 1.98 volts, and charged for the time duration T3 of 2 hours at the second cutoff voltage. Battery charging is completed thereafter the third time duration T3, after which the battery returns to a quiescent value at the first cutoff voltage. Total battery charging time is 13 hours. No gassing was observed at any time, using the method of charging batteries 100 and the battery charging system 210 of the present invention.

FIG. 12 is an actual battery charging profile of a typical 3.0 silver zinc battery at a particular state of charge, starting out not substantially fully charged, showing results of charging with the method of charging batteries 100 of the present invention and the battery charging system 210 of the present invention.

The battery charging profile of FIG. 12 shows the battery voltage below the first cutoff voltage during and at the end of the first time duration T1, which is one hour, indicating that the battery is not substantially fully charged. The battery, thus, continues to be charged at the first cutoff voltage, which is 1.87 volts, for the alternate second time duration T2', which is 8 hours. The cutoff voltage is then raised to the second cutoff voltage, which is 1.98 volts, and charged for the alternate time duration T3' of 4 hours at the second cutoff voltage. Battery charging is completed thereafter the alternate third time duration T3', after which the battery returns to a quiescent value at the first cutoff voltage. Total battery charging time is 13 hours. No gassing was observed at any time, using the method of charging batteries 100 and the battery charging system 210 of the present invention.

Each of the batteries of the battery charging system 210 can, thus, be individually charged in series without the necessity of using a plurality of current sources, using the method of charging batteries 100 of the present invention. Battery packs often typically have batteries in series. Thus, all batteries in a battery pack may be individually and independently charged in series to their respective cutoff voltages, thus ensuring a balanced battery back.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of charging at least one battery comprising the following steps:
    charging said at least one battery at a first voltage for a first time duration;
    determining state of charge of said at least one battery at the end of said first time duration;
    if said at least one battery is substantially fully charged at the end of said first time duration, charging said at least one battery at said first voltage for a second time duration, and charging said at least one battery at a second voltage for a third duration of time;
    if said at least one battery is substantially fully depleted at the end of said first time duration, charging said at least one battery at said first voltage for an alternate second time duration, and charging said at least one battery at said second voltage for an alternate third duration of time.

2. The method according to claim 1, wherein total time required to charge said at least one battery is the sum of said first time duration, said second time duration and said third time duration, or the sum of said first time duration, said alternate second time duration, and said alternate third time duration.

3. The method according to claim 2, wherein said total time required to charge said at least one battery is substantially equal to battery capacity of said at least one battery divided by charging current supplied to said at least one battery.

4. The method according to claim 1, wherein said first voltage is substantially equal to a voltage between a first plateau and a second plateau of a charging profile of said at least one battery.

5. The method according to claim 1, wherein said second voltage is substantially equal to a voltage on or slightly above a second plateau, prior to a steeply rising curve of a charging profile of said at least one battery.

6. The method according to claim 1, wherein said first duration of time commences at commencement of charging and is substantially equal to a factor multiplied by battery capacity of said at least one battery divided by charging current supplied to said at least one battery, said factor being between 0.05 and 0.10.

7. The method according to claim 1, wherein
if said at least one battery is substantially fully charged at said end of said first time duration,
said second time duration commences at the end of said first time duration and ends at the beginning of said third time duration, and is substantially equal to a factor multiplied by battery capacity of said at least one battery divided by charging current supplied to said at least one battery, said factor being between 0.55 and 0.65, and
said third time duration is substantially equal to a factor multiplied by said second time duration, said factor being between 0.45 and 0.55.

8. The method according to claim 1, wherein
if said at least one battery is substantially fully depleted at said end of said first time duration,
said alternate second time duration commences at the end of said first time duration and ends at the beginning of said alternate third time duration, and is substantially equal to a factor multiplied by battery capacity of said at least one battery divided by charging current supplied to said at least one battery, said factor being between 0.70 and 0.80, and
said alternate third time duration is substantially equal to a factor multiplied by said second time duration, said factor being between 0.15 and 0.25.

9. The method according to claim 1 wherein said steps of said method of charging said at least one battery are controlled by a cutoff voltage controller and timer.

10. The method according to claim 9 wherein said cutoff voltage controller and timer is a microcontroller.

11. The method according to claim 1 wherein said steps of said method of charging said at least one battery are controlled by a microcontroller.

12. A method of charging at least one battery comprising the following steps:
charging said at least one battery at a first voltage for a first time duration;
determining state of charge of said at least one battery at the end of said first time duration;
if said at least one battery is substantially fully charged at the end of said first time duration, charging said at least one battery at said first voltage for a second time duration, and charging said at least one battery at a second voltage for a third duration of time;
if said at least one battery is substantially fully depleted at the end of said first time duration, charging said at least one battery at said first voltage for an alternate second time duration, and charging said at least one battery at said second voltage for an alternate third duration of time; wherein
total time required to charge said at least one battery is the sum of said first time duration, said second time duration and said third time duration, or the sum of said first time duration, said alternate second time duration, and said alternate third time duration;
said total time required to charge said at least one battery is substantially equal to battery capacity of said at least one battery divided by charging current supplied to said at least one battery;
said first voltage is substantially equal to a voltage between a first plateau and a second plateau of a charging profile of said at least one battery;
said second voltage is substantially equal to a voltage on or slightly above a second plateau, prior to a steeply rising curve of a charging profile of said at least one battery;
said first duration of time commences at commencement of charging and is substantially equal to a factor multiplied by battery capacity of said at least one battery divided by charging current supplied to said at least one battery, said factor being between 0.05 and 0.10;
if said at least one battery is substantially fully charged at said end of said first time duration,
said second time duration commences at the end of said first time duration, and is substantially equal to a factor multiplied by battery capacity of said at least one battery divided by charging current supplied to said at least one battery, said factor being between 0.55 and 0.65, and
said third time duration commences at the end of said second time duration, and is substantially equal to a factor multiplied by said second time duration, said factor being between 0.45 and 0.55;
if said at least one battery is substantially fully depleted at said end of said first time duration,
said alternate second time duration commences at the end of said first time duration, and is substantially equal to a factor multiplied by battery capacity of said at least one battery divided by charging current supplied to said at least one battery, said factor being between 0.70 and 0.80, and
said alternate third time duration commences at the end of said alternate second time duration, and is substantially equal to a factor multiplied by said alternate second time duration, said factor being between 0.15 and 0.25.

13. A battery charging system comprising:
a current source;
a cutoff voltage controller and timer;
at least one battery;
and respective ones of voltage and current regulators, which regulate voltages applied to each said respective one of said batteries and current supplied to each said respective one of said batteries;
said cutoff voltage controller and timer controlling said voltages and controlling time durations of said voltages applied to each of said respective ones of said batteries therethrough control of said voltage and current regulators.

14. The battery charging system according to claim 13, wherein said cutoff voltage controller and timer is a microcontroller.

15. The battery charging system according to claim 13, wherein said battery charging system performs steps of a process of charging said at least one battery.

16. The battery charging system according to claim 15, wherein said cutoff voltage controller and timer controls steps of said process of charging said at least one battery.

17. The battery charging system according to claim 13, wherein said battery charging system performs steps of a process of charging said at least one battery comprising the following steps:
charging said at least one battery at a first voltage for a first time duration;
determining state of charge of said at least one battery at the end of said first time duration;
if said at least one battery is substantially fully charged at the end of said first time duration, charging said at least one battery at said first voltage for a second time duration, and charging said at least one battery at a second voltage for a third time duration;

if said at least one battery is substantially fully depleted at the end of said first time duration, charging said at least one battery at said first voltage for an alternate second time duration, and charging said at least one battery at said second voltage for an alternate third time duration.

18. The battery charging system according to claim 13, wherein said battery charging system performs steps of a process of charging said at least one battery comprising the following steps:

charging said at least one battery at a first voltage for a first time duration;

determining state of charge of said at least one battery at the end of said first time duration;

if said at least one battery is substantially fully charged at the end of said first time duration, charging said at least one battery at said first voltage for a second time duration, and charging said at least one battery at a second voltage for a third duration of time;

if said at least one battery is substantially fully depleted at the end of said first time duration, charging said at least one battery at said first voltage for an alternate second time duration, and charging said at least one battery at said second voltage for an alternate third duration of time; wherein total time required to charge said at least one battery is the sum of said first time duration, second time duration and said third time duration, or the sum of said first time duration, said alternate second time duration, and said alternate third time duration;

said total time required to charge said at least one battery is substantially equal to battery capacity of said at least one battery divided by charging current supplied to said at least one battery;

said first voltage is substantially equal to a voltage between a first plateau and a second plateau of a charging profile of said at least one battery;

said second voltage is substantially equal to a voltage on or slightly above a second plateau, prior to a steeply rising curve of a charging profile of said at least one battery;

said first duration of time commences at commencement of charging and is substantially equal to a factor multiplied by battery capacity of said at least one battery divided by charging current supplied to said at least one battery, said factor being between 0.05 and 0.1;

if said at least one battery is substantially fully charged at said end of said first time duration, said second time duration commences at the end of said first time duration, and is substantially equal to a factor multiplied by battery capacity of said at least one battery divided by charging current supplied to said at least one battery, said factor being between 0.55 and 0.65, and said third time duration commences at the end of said second time duration, and is substantially equal to a factor multiplied by said second time duration, said factor being between 0.45 and 0.55;

if said at least one battery is substantially fully depleted at said end of said first time duration, said alternate second time duration commences at the end of said first time duration, and is substantially equal to a factor multiplied by battery capacity of said at least one battery divided by charging current supplied to said at least one battery, said factor being between 0.70 and 0.80, and said alternate third time duration commences at the end of said alternate second time duration, and is substantially equal to a factor multiplied by said alternate second time duration, said factor being between 0.15 and 0.25.

* * * * *